US005966039A

United States Patent [19]

[11] Patent Number: 5,966,039

[45] Date of Patent: Oct. 12, 1999

Koglin et al.

[54] SUPPLY AND TEMPERATURE DEPENDENT LINEAR SIGNAL GENERATOR

[75] Inventors: Dennis Michael Koglin, Carmel; Robert Harrison Reed, Kokomo, both of Ind.

[73] Assignee: Delco Electronics Corpooration, Kokomo, Ind.

[21] Appl. No.: 08/988,678

[22] Filed: Dec. 11, 1997

[51] Int. Cl.[6] ........ G06F 7/44

[52] U.S. Cl. ........ 327/356; 327/362; 327/378; 327/539; 323/315; 323/313

[58] Field of Search ........ 327/538, 540, 327/542, 530, 545, 539, 356, 359, 362, 378; 323/312–315, 316, 907; 330/289

[56] References Cited

U.S. PATENT DOCUMENTS

| | | | |
|---|---|---|---|
| 5,068,595 | 11/1991 | Kearney et al. | 323/316 |
| 5,534,816 | 7/1996 | Koglin et al. | 327/513 |
| 5,608,348 | 3/1997 | Kearney et al. | 327/538 |
| 5,619,122 | 4/1997 | Kearney et al. | 323/312 |

*Primary Examiner*—Kenneth B. Wells
*Assistant Examiner*—Minh Nguyen
*Attorney, Agent, or Firm*—Jimmy L. Funke

[57] ABSTRACT

A supply and temperature dependent linear signal generating circuit includes four transistors each having a unique current flowing therethrough and connected together to form a current multiplier. A first one of the currents is designed to be supply dependent and preferably adjustable in magnitude, a second one is designed to exhibit a specific temperature dependence, the third is designed to be both supply and temperature independent and the fourth current is defined as a ratio of the first three. The fourth current is, in one embodiment, impressed upon a network defined by a resistor divider and a voltage source to thereby define an output voltage V(T) that is both supply and temperature dependent according to the following equation:

$$V(T)=KX*(T-TN),$$

wherein KX is the slope of V(T) over temperature, T is the operating temperature and TN is a reference temperature at which V(T) is equal to zero. Preferably, TN is adjustable via the adjustable magnitude of the first current.

20 Claims, 2 Drawing Sheets

SUPPLY AND TEMPERATURE DEPENDENT LINEAR SIGNAL GENERATOR

FIELD OF THE INVENTION

The present invention relates generally to linear signal generating circuitry, and more specifically to such circuitry for generating a supply and temperature dependent linear signal.

BACKGROUND OF THE INVENTION

Circuitry for generating linear and temperature dependent signals are generally known and widely used in the electronics industry. Such circuitry is often required to compensate for inherent temperature dependencies in systems utilizing one or more transducers formed of piezoresistive sensing elements, wherein a temperature dependent signal of the form:

$$F(T)=KX^*(T-TN) \tag{1}$$

is typically required. In equation (1), KX is the slope of F(T) versus temperature and TN is a reference temperature at which F(T) is equal to zero.

While circuits capable of generating F(T) signals in accordance with equation (1) have been successfully used in the past, all such known circuits have drawbacks associated therewith. For example, in all such known circuits, KX is independent of supply voltage (hereinafter referred to as VDD). Thus, in applications where system output scaling with VDD is required, all circuitry utilizing the F(T) signal must likewise operate independently of VDD. Eventually, however, the system output signal must be multiplied by a factor of VDD in order to avoid excessive ratiometricity errors at temperatures other than TN.

Requiring all circuitry utilizing the F(T) signal to operate independently of VDD typically necessitates incorporation of complicated bandgap circuitry therein. What is therefore needed is a signal generating circuit operable to generate an F(T) signal in accordance with equation (1), wherein the slope term (KX) is temperature dependent. Such a circuit would simplify the design of subsequent circuitry utilizing the F(T) signal by eliminating the need for the inclusion of bandgap circuitry therein to achieve VDD independence.

SUMMARY OF THE INVENTION

The forgoing shortcomings of the prior art are addressed by the present invention. In accordance with one aspect of the present invention, circuitry for producing a supply and temperature dependent linear signal comprises a supply voltage, means for providing a reference voltage independent of temperature and the supply voltage, a current multiplier circuit having four primary currents I1, I2, I3 and I4 flowing therethrough, wherein the four primary currents are functionally related according to the equation I1*I2=I3*I4. A first circuit is coupled to the supply voltage and the current multiplier circuit, and the first circuit defines I1 as a function of the supply voltage. A second circuit is coupled to the current multiplier circuit and defines I2 as a linear function of temperature. A third circuit is coupled to the current multiplier circuit and defines I3 as a function of the reference voltage.

I4 defines the supply and temperature dependent linear signal according to the above equation.

In accordance with another aspect of the present invention, the circuitry of the present invention further includes a fourth circuit coupled to the current multiplier circuit which defines an output voltage as a function of I4, wherein the output voltage is a supply and temperature dependent linear voltage. In one embodiment, this output voltage is represented as V(T) and is defined by the equation V(T)=KX*(T−TN), wherein KX is a slope of V(T) over temperature, T is an operating temperature of the circuitry and TN is a reference temperature at which V(T) is equal to zero. Preferably, the reference temperature TN is a function of I1, wherein I1 is an adjustable current to thereby adjust the reference temperature TN to a desired value.

One object of the present invention is to provide a circuit for producing a supply and temperature dependent linear output signal.

Another object of the present invention is to provide such a circuit including means for adjusting the linear output signal to a desired value at a particular temperature.

These and other objects of the present invention will become more apparent from the following description of the preferred embodiment.

DESCRIPTION OF THE PREFERRED EMBODIMENT

Figure 1:
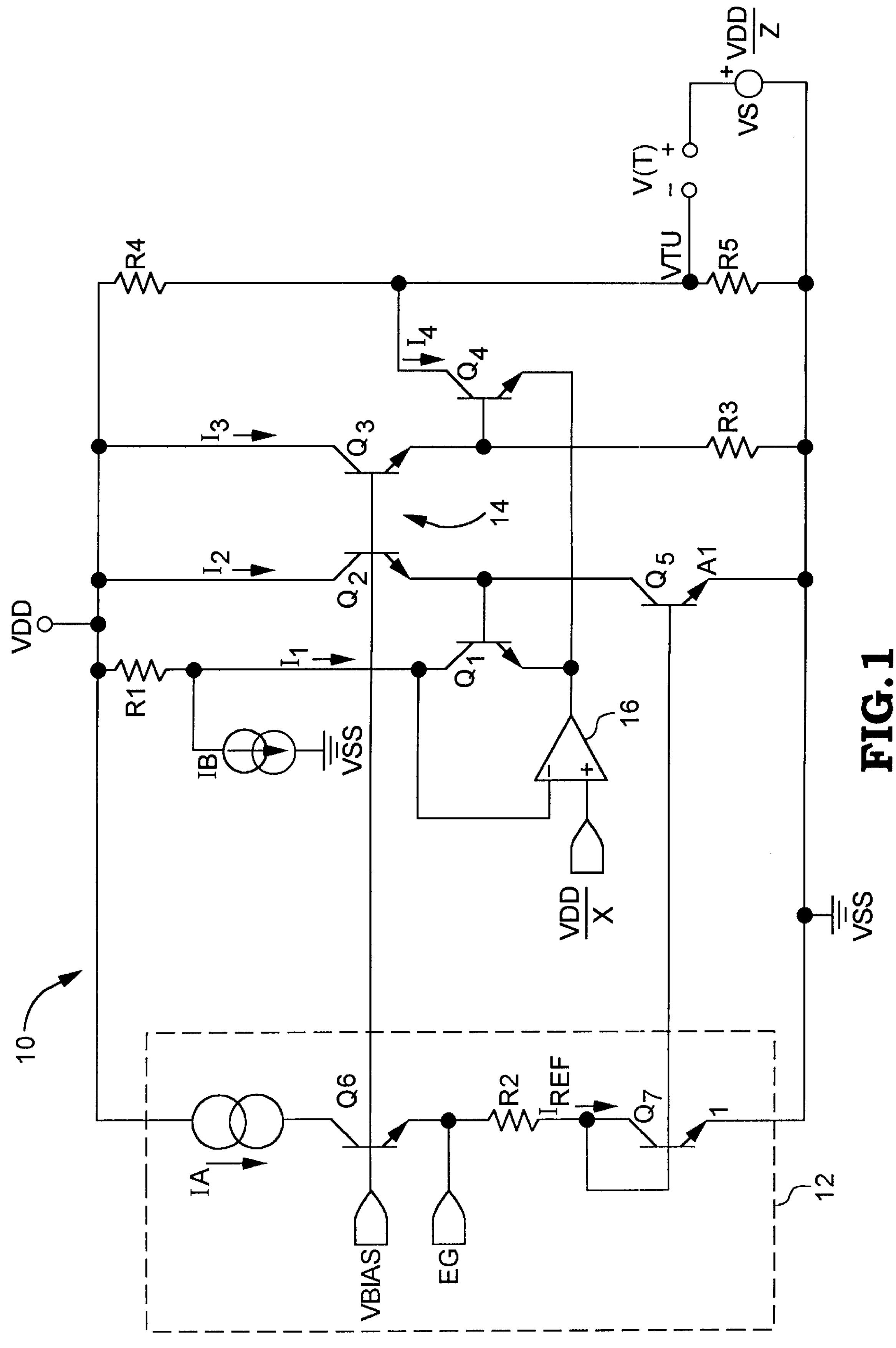
FIG. 1 is a schematic diagram of one preferred embodiment of a supply and temperature dependent linear voltage generator, in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a schematic diagram of one preferred embodiment of a supply and temperature dependent linear signal generating circuit 10, in accordance with the present invention, is shown. Circuit 10 includes a reference circuit 12 having a temperature and supply independent voltage EG as an input thereto. Temperature independent voltage EG may be provided by any known circuit or source, and is preferably a bandgap voltage having a value of approximately 1.24 volts as is known in the art of silicon semiconductor fabrication. In one preferred embodiment of the present invention, reference circuit 12 is constructed from a known Widlar bandgap reference circuit which will be described in greater detail hereinafter with reference to FIG. 2. Reference circuit 12 further includes a current source IA connected at one end to supply voltage VDD and at its opposite end to a collector of NPN transistor Q6. The base of Q6 is connected to a suitable bias voltage VBIAS, and its emitter is connected to one end of a resistor R2 and the temperature independent voltage EG. The opposite end of resistor R2 is connected to the base and collector of an NPN transistor Q7 having an emitter connected to a ground reference VSS.

Central to the circuit 10 of the present invention is a current multiplier circuit 14 preferably comprised of four NPN transistors Q1, Q2, Q3 and Q4 and connected such that their base-emitter voltages form a voltage loop. Specifically, the bases of transistors Q2 and Q3 are connected together as well as to the base of transistor Q6, and the collectors of Q2 and Q3 are each connected to VDD. The emitter of Q2 is connected to the base of Q1 and to the collector of NPN transistor Q5. The base of Q5 is connected to the base-collector of Q7, and its emitter is connected to VSS.

The collector of Q1 is connected to one end of a resistor R1, the opposite end of which is connected to VDD, a current source IB configured to draw the current IB away from Q1 and an inverting input of an operational amplifier 16 of known construction. The non-inverting input of operational amplifier 16 is connected to a voltage source VDD/x that is a fraction of VDD, and the output of operational amplifier 16 is connected to the emitter of Q1. In one preferred embodiment of circuit 10, x=2 so that the non-inverting input of operational amplifier 16 is set at mid supply (0.5 VDD).

Current source IB is preferably an adjustable current source that is dependent upon supply voltage VDD. One example of such an adjustable current source for use with the present invention is given in U.S. Pat. No. 5,608,348 to Kearney et al., entitled BINARY PROGRAMMABLE CURRENT MIRROR, which is assigned to the assignee of the present invention, and the contents of which are incorporated herein by reference. Other examples are given in U.S. Pat. No. 5,534,816 to Koglin et al. and U.S. Pat. No. 5,619,122 to Kearney et al., each of which are assigned to the assignee of the present invention, the contents of each being incorporated herein by reference.

The emitter of Q3 is connected to the base of Q4 and to one end of a resistor R3. The opposite end of R3 is connected to VSS. The emitter of Q4 is connected to the emitter of Q1 and to the output of operational amplifier 16, and the collector of Q4 is connected to one end of a resistor R4 and one end of a resistor R5. The opposite end of R4 is connected to VDD and the opposite end of R5 is connected to VSS. A voltage source VS is connected at a negative end thereof to VSS. The temperature and supply dependent linear voltage output V(T) of circuit 10 is established between the positive end of voltage source VS and the circuit node VTU defined by the common connection of resistors R4 and R5 and the collector of Q4. Voltage source VS is set to VDD/z which is a fraction of supply voltage VDD. In one preferred embodiment, z=2 so that VS is set to mid supply (0.5 VDD).

Transistors Q1–Q4 are connected such that their base-emitter voltages (Vbe's) form a voltage loop, and each of these transistors has a corresponding current I1–I4 flowing therethrough as shown in FIG. 1. In accordance with known equations, current multiplier 14 produces a functional relationship between the currents I1–I4 which is given by the equation:

$$I1*I2=I3*I4 \qquad (2).$$

Due to the configuration of operational amplifier 16 and transistor Q1, the voltage VDD/X (0.5 VDD) is forced onto the collector of Q1 so that the current I1 can be determined from well known equations as:

$$I1=(0.5\ VDD/R1)-IB \qquad (3).$$

The emitter areas of transistors Q3 and Q6 are preferably the same so that they have approximately the same emitter current densities. In accordance with well known equations, the current I3 is thus given by the equation:

$$I3=EG/R3 \qquad (4).$$

Transistors Q5 and Q7 form a current mirror so that the current I2 flowing through Q2 and Q5 is a multiple of the current $I_{REF}$ flowing through Q7 as shown in FIG. 1. The emitter area of Q5 is sized larger than that of Q7 such that the ratio of emitter areas of Q5/Q7 is A1. In accordance with well known equations, I2 is thus given by the equation:

$$I2=A1*I_{REF} \qquad (5).$$

With the temperature independent voltage EG impressed upon resistor R2, and in accordance with well known equations, the current $I_{REF}$ is given by the equation:

$$I_{REF}=[EG-Vbe(Q7)]/R2 \qquad (6).$$

It is known that the base-emitter voltage of a bipolar transistor, such as Q7, exhibits a temperature dependence of the form:

$$Vbe(T)=(T/To)*(Vbeo-EG)+EG \qquad (7),$$

where T=operating temperature (°K.), To=reference temperature (°K.), Vbeo=base-emitter voltage at temperature To, and EG=bandgap voltage. Substituting equations (6) and (7) into equation (5), the current I2 is given by the equation:

$$I2=-A1*(T/To)*[Vbeo(Q7)-EG]/R2 \qquad (8).$$

Defining the constant term:

$$Y=(-A1/To)*(R3/R2)*[Vbeo(Q7)/EG-1],$$

substituting equations (3), (4) and (8) into equation (2) and solving for I4 produces the following equation for I4:

$$I4=[(0.5\ VDD/R1)-IB]*Y*T \qquad (9).$$

The collector current I4 of transistor Q4 loads the Thevenin voltage VTU formed by the voltage divider of resistors R4 and R5. In accordance with well known equations, the Thevenin voltage VTU is thus given by the equation:

$$VTU=Vth-Rth*I4 \qquad (10),$$

where Vth=(R5*VDD)/(R4+R5), and Rth=(R4*R5)/(R4+R5). With VDD/z=0.5 VDD, the temperature and supply dependent linear voltage output V(T) is given by the equation:

$$V(T)=0.5\ VDD-VTU \qquad (11).$$

Substituting equations (9) and (10) into equation (11), the temperature and supply dependent linear voltage V(T) becomes:

$$V(T)=\{Rth*Y*[(0.5\ VDD/R1)-IB]\}*T-(Vth-0.5\ VDD) \qquad (12).$$

In terms of equation (1) above, KX={Rth*Y*[(0.5 VDD/R1)–IB]} and TN=(Vth–0.5 VDD)/KX. With adjustable current source IB preferably VDD dependent as described hereinabove, the temperature and supply dependent linear voltage V(T) may be calibrated to a desired value at a particular temperature by adjusting IB.

Figure 2:
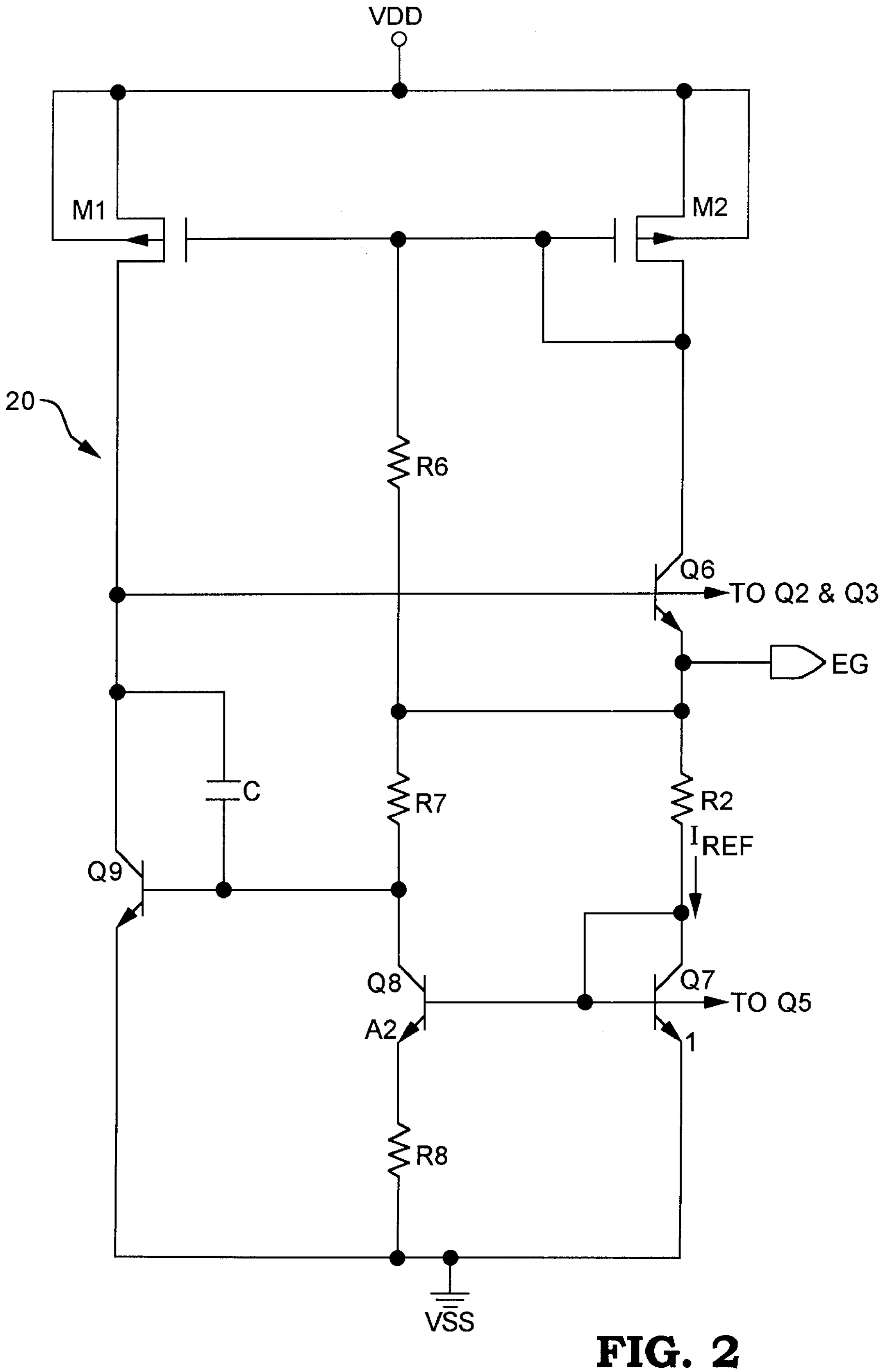
FIG. 2 is a schematic diagram of one preferred embodiment of a bandgap reference circuit for use with the signal generating circuit of FIG. 1.

Referring now to FIG. 2, a known Widlar bandgap reference circuit 20 is shown which, in one preferred embodiment, forms the reference circuit 12 illustrated in FIG. 1. Circuit 20 includes transistors Q6 and Q7 as well as resistor R2 as discussed with reference to FIG. 1. A first MOS transistor M1 has a source connected to VDD and a gate connected to a gate and drain of a second MOS transistor M2, one end of a resistor R6 and to the collector of Q6. The source of M2 is connected to VDD, and the drain of M1 is connected to the base of Q6, the collector of an NPN transistor Q9 and one end of a capacitor C. The base of Q9 is connected to the opposite end of capacitor C, to the collector of an NPN transistor Q8 and to one end of a resistor R7. The opposite end of R7 is connected to the remaining end of R6 and to the circuit node defined by the emitter of Q6 and resistor R2. This node provides the bandgap voltage EG. The base of Q8 is connected to the collector and base of transistor Q7, and the emitter of Q8 is connected to one end of a resistor R8. The opposite end of resistor R8 is connected to VSS as is the emitter of Q9.

In the bandgap reference circuit 20 of FIG. 2, the voltage EG is the sum of the base-emitter voltage of Q9, Vbe(Q9), and the voltage across R7, V(R7). As is known in the art, Vbe(Q9) for known silicon semiconductor fabrication processes exhibits a temperature coefficient of approximately −2 mV/°C.

The emitter area of Q8 is sized larger than that of Q7 by a factor of A2. Since Q7 and Q8 form a current mirror, the current flowing through Q8 is proportional to that flowing through Q7, with the magnitude of the Q8 current depending upon the value of R8 and the emitter size A2 as compared to the size of the emitter of Q7. In any event, the current flowing through Q8 impresses a delta Vbe voltage across resistor R8. The current flowing through R8 likewise produces a delta Vbe voltage V(R7) across resistor R7, wherein such delta Vbe voltages exhibit a positive temperature coefficient as is known in the art. Both Vbe(Q9) and V(R7) are supply voltage independent and have opposite temperature coefficients. Via proper selection of A2 and the ratio of resistors R7 and R8, the voltage EG may be made temperature independent as is known in the art.

From the foregoing it should now be apparent that I1 is designed to be supply dependent and preferably adjustable in magnitude, I2 is designed to exhibit a highly linear temperature dependence, I3 is designed to be both supply and temperature independent and I4 is defined as a ratio of I1–I3. I4 is, in one embodiment, impressed upon a network defined by a resistor divider and a voltage source to thereby define an output voltage V(T) that is both supply and temperature dependent according to the following equation:

$$V(T)=KX*(T-TN),$$

wherein KX is the slope of V(T) over temperature, T is the operating temperature and TN is a reference temperature at which V(T) is equal to zero. TN is adjustable via the adjustable magnitude of current source IB. The supply dependence of V(T) eliminates any need for additional bandgap circuitry in circuits utilizing V(T). Moreover, since the current source IB is preferably an adjustable current source, the voltage V(T) may be forced to any desired value (such as zero) at any desired temperature TN, and the circuit 10 will operate as described hereinabove to produce a linear voltage at temperatures other than TN that is supply dependent. Those skilled in the art will, however, recognize that the circuit 10 of the present invention may alternatively be configured to produce a temperature and supply dependent linear current source or sink, and any required modifications to circuit 10 will become readily apparent to a skilled artisan.

Although the circuit 10 of the present invention may be constructed from discrete electrical components, it is preferably formed in accordance with known integrated circuit fabrication techniques. In one preferred embodiment, circuit 10 is fabricated in accordance with a known BiCMOS process.

The following table sets forth component and other design parameter values of circuit 10 and circuit 20 in accordance with one specific embodiment thereof. It should be understood, however, that the following component and design parameter values are given by way of example only, and are accordingly not intended to limit in any way the scope of the present invention.

| Component or Design Parameter | Value |
|---|---|
| R1 | 60.17 kΩ |
| R2 | 32.5 kΩ |
| R3 | 34 kΩ |
| R4 | 50 kΩ |
| R5 | 200 kΩ |
| R6 | 2 MΩ |
| R7 | 32.5 kΩ |
| R8 | 2 kΩ |
| X | 2 |
| Z | 2 |
| A1 | 2 |
| A2 | 3 |

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

The embodiments of the invention in which an exclusive property or privilege is claimed are defined as follows:

1. Circuitry for producing a supply and temperature dependent linear signal comprising:

- a supply voltage;
- means for providing a reference voltage independent of temperature and said supply voltage;
- a current multiplier circuit having four primary currents I1, I2, 13 and I4 flowing therethrough, said four primary currents functionally related according to the equation $$I1*I2=I3*I4;$$

- a first circuit coupled to said supply voltage and said current multiplier circuit, said first circuit defining I1 as a function of said supply voltage;
- a second circuit coupled to said current multiplier circuit and defining I2 as a linear function of temperature; and
- a third circuit coupled to said current multiplier circuit and defining I3 as a function of said reference voltage;
- wherein I4 defines said supply and temperature dependent linear signal according to said equation.

2. The circuitry of claim 1 further including a fourth circuit coupled to said current multiplier circuit and defining an output voltage as a function of I4, said output voltage being a supply and temperature dependent linear voltage.

3. The circuitry of claim 2 wherein said output voltage is represented as V(T) and is defined by the equation $$V(T)=KX*(T-TN),$$

wherein KX is a slope of V(T) over temperature, T is an operating temperature of said circuitry and TN is a reference temperature at which V(T) is equal to zero.

4. The circuitry of claim 3 wherein said reference temperature TN is a function of I1.

5. The circuitry of claim 4 wherein I1 is an adjustable current to thereby adjust said reference temperature TN to a desired value.

6. The circuitry of claim 1 wherein said current multiplier circuit includes four transistors Q1, Q2, Q3 and Q4, each of said transistors having a corresponding one of said primary currents I1, 12, I3 and I4 flowing therethrough.

7. The circuitry of claim 6 wherein said first circuit includes:

a first resistor connected at one end to said supply voltage and at an opposite end to Q1 with I1 flowing therethrough, said opposite end of said first resistor defining a first circuit node; and an operational amplifier coupled to said first circuit node and operable to force a first fraction of said supply voltage thereat.

8. The circuitry of claim 7 wherein said operational amplifier includes an inverting input connected to said first fraction of said supply voltage and an output connected to said transistor Q1.

9. The circuitry of claim 7 further including a current source connected to said first circuit node and operable to draw a current IB away from said first circuit node.

10. The circuitry of claim 9 wherein said current source is an adjustable current source.

11. The circuitry of claim 9 wherein said second circuit includes:

a bipolar transistor Q5 connected in series with Q2 with I2 flowing therethrough;

a second resistor connected at one end to said reference voltage; and a bipolar transistor Q7 connected to an opposite end of said second resistor and forming a current mirror with Q5, said transistor Q7 having a base-emitter voltage associated therewith;

and wherein I2 is a ratio of said base-emitter voltage of Q7 and said second resistor.

12. The circuitry of claim 11 wherein transistors Q1, Q2, Q3 and Q4 are bipolar transistors, and wherein said third circuit includes:

a third resistor connected at one end thereof to Q3 and defining a second circuit node thereat, said third resistor having I3 flowing therethrough;

a bipolar transistor Q6 connected to said reference voltage and coupled to Q3 to thereby forcing said reference voltage at said second circuit node;

and wherein I3 is defined as a ratio of said reference voltage and said third resistor.

13. The circuitry of claim 12 further including a fourth circuit coupled to said current multiplier circuit and defining an output voltage as a function of I4, said output voltage being a supply and temperature dependent linear voltage.

14. The circuitry of claim 13 wherein said fourth circuit includes:

a fourth resistor connected at one end thereof to said supply voltage;

a fifth resistor connected at one end thereof to an opposite end of said fourth resistor and defining a third circuit node thereat; and a voltage source defining a second fraction of said supply voltage;

and wherein Q4 is connected to said third circuit node to thereby draw I4 away therefrom;

and wherein said output voltage is defined between said third circuit node and said voltage source.

15. The circuitry of claim 14 wherein said output voltage is represented as V(T) and is defined by the equation $$V(T)=KX*(T-TN),$$

wherein KX is a slope of V(T) over temperature, T is an operating temperature of said circuitry and TN is a reference temperature at which V(T) is equal to zero.

16. The circuitry of claim 15 wherein said reference temperature TN is proportional to IB.

17. The circuitry of claim 16 wherein IB is an adjustable current source.

18. The circuitry of claim 15 wherein said reference voltage is a bandgap voltage.

19. The circuitry of claim 1 wherein said means for providing a reference voltage independent of temperature and said supply voltage is a bandgap reference circuit.

20. The circuitry of claim 19 wherein said circuitry for producing a supply and temperature dependent linear signal and said bandgap reference circuit form at least a portion of an integrated circuit.

* * * * *